United States Patent [19]

Gasser et al.

[11] 4,104,756
[45] Aug. 8, 1978

[54] MACHINE FOR WAXING VEHICLES

[75] Inventors: William J. Gasser, Long Grove, Ill.; Richard H. Cooper, Genoa City, Wis.

[73] Assignee: Brite-O-Matic Manufacturing, Inc., Arlington Heights, Ill.

[21] Appl. No.: 731,831

[22] Filed: Oct. 12, 1976

[51] Int. Cl.² ................................................ B60S 3/06
[52] U.S. Cl. ................................. 15/97 B; 15/230.16; 51/334; 118/109; 118/110
[58] Field of Search ............... 15/97 R, 97 B, 230, 15/230.14, 230.16; 51/334, 337; 118/72, 112, 258, 109, 110; 427/368, 359

[56] References Cited

U.S. PATENT DOCUMENTS

| | | | |
|---|---|---|---|
| 2,638,617 | 5/1953 | Doering | 15/230.16 |
| 3,345,666 | 10/1967 | Hanna et al. | 15/97 B |
| 3,711,883 | 1/1973 | Ennis | 15/97 B |
| 3,774,259 | 11/1973 | Genaro | 15/97 B |
| 3,869,833 | 3/1975 | Belanger | 15/230.14 X |
| 3,940,821 | 3/1976 | Moran | 15/97 B |

*Primary Examiner*—Edward L. Roberts
*Attorney, Agent, or Firm*—Richard G. Lione

[57] ABSTRACT

A machine and method for preparing the surface and waxing vehicles. The machine has an improved head construction comprising a plurality of pads of a heavy wool and Orlon fabric fastened at their inner ends to a rotating shaft and slit inwardly on 2½ inch centers from their outward edges for a distance of 12 inches. The strips formed each overlap two strips on each adjacent sheet. Wax is applied to the surface at 185-190 rpm while traversing the vehicle at 5.5 - 6.0 feet per minute. A first traversal end to end and return with the wax still moist cleans the surface grime and oxidized paint off. A second traversal end to end and return then buffs dried wax to a high gloss finish.

1 Claim, 4 Drawing Figures

MACHINE FOR WAXING VEHICLES

FIELD OF THE INVENTION

This invention relates in general to the surface preparation and waxing of vehicles. It relates more particularly to apparatus and a method for machine cleaning, deoxidizing, and waxing vehicles.

BACKGROUND OF THE INVENTION

Machine waxing of vehicles is not new. The Gennaro U.S. Pat. No. 3,774,259 illustrates a machine for accomplishing this end. The machine illustrated can not effectively clean and deoxidize, however. A separate operation is required for that. There are, of course, other less completely mechanized systems for cleaning and waxing automobiles. None, however, can simply and expeditiously in one operation produce a finished product which compares with hand surface preparation and waxing. Hand work is, unfortunately in these days of high labor costs, prohibitively expensive on a commercial basis.

SUMMARY OF THE INVENTION

The applicant's invention is embodied in a greatly improved machine and method for surface preparation and waxing of vehicles. A primary object is to machine clean, deoxidize, and wax a vehicle so that the product which results is actually better than that produced by hand. Specifically, an object of the invention is to produce a high quality, waxed surface, uniformly over an entire vehicle. Another object is to machine clean, deoxidize, and wax a vehicle quickly with only a single operator in attendance.

These and other objects of the invention are realized by providing a machine including two buffing heads which traverse the length of an automobile, for example, in both directions on a track system under the control of one operator. A single horizontal axis head buffs the hood, top and trunk horizontal surfaces. A single horizontal axis head buffs the hood, top and trunk horizontal surfaces. A single vertical axis head buffs the side, back, and front vertical surfaces.

The heads are substantially identical in construction. Each comprises a shaft from which thirty-two sheets or "pads" of a heavy (⅜ inch thick) material fabricated of wool and Orlon extend radially outward. The pads are fastened at their inner ends to the shaft along its length. They are spaced evenly around the circumference of the shaft.

Each pad is slit inwardly from its outer edge at 2½ inch intervals along its length. The slits extending inwardly 12 inches from the edge of each pad so as to provide a series of 12 inch strips, each two and one-half inches wide.

The pads are slit on a staggered basis, in succession, so that the slits do not line up. As a result, each strip overlaps two strips on a pad next adjacent to it.

The heads are moved past a stationary automobile while being rotated in a direction corresponding to their direction of travel. A waxing compound composed of a light silicone with some Cannuba wax content, a light solvent and a light abrasive (corn starch and silica are examples of the latter) is sprayed onto the automobile's external surfaces immediately prior to buffing by the buffing heads.

The head shafts are positioned relative to the surfaces being polished so that they travel approximately 12 inches away while following corresponding surfaces. Accordingly, the pad strips engage the automobile surface over approximately their outermost 6 inches.

The buffing heads are preferably rotated at a speed of 187 revolutions per minute (rpm). According to the invention, superior waxing is obtained at precisely this speed when the heads traverse the automobile at a rate of 5.78 feet per minute. The rotational speed may be varied as the traversal speed is varied. A higher rotational speed demands of a higher traversal speed. However, the superior finish characteristic of the invention is achieved with minimum vehicle surface wear and buffing pad wear at approximately 185 to 190 rpm with a traversal speed of 5.5 to 6.0 feet per minute.

The heads traverse the automobile front to back twice in the method of the invention. The first front to back and return trip is completed before the wax is dry and is the cleaning and deoxidizing step. The second front to back and return trip is over dried wax and produces the high polish finish.

DESCRIPTION OF THE PREFERRED EMBODIMENT

Figure 1:
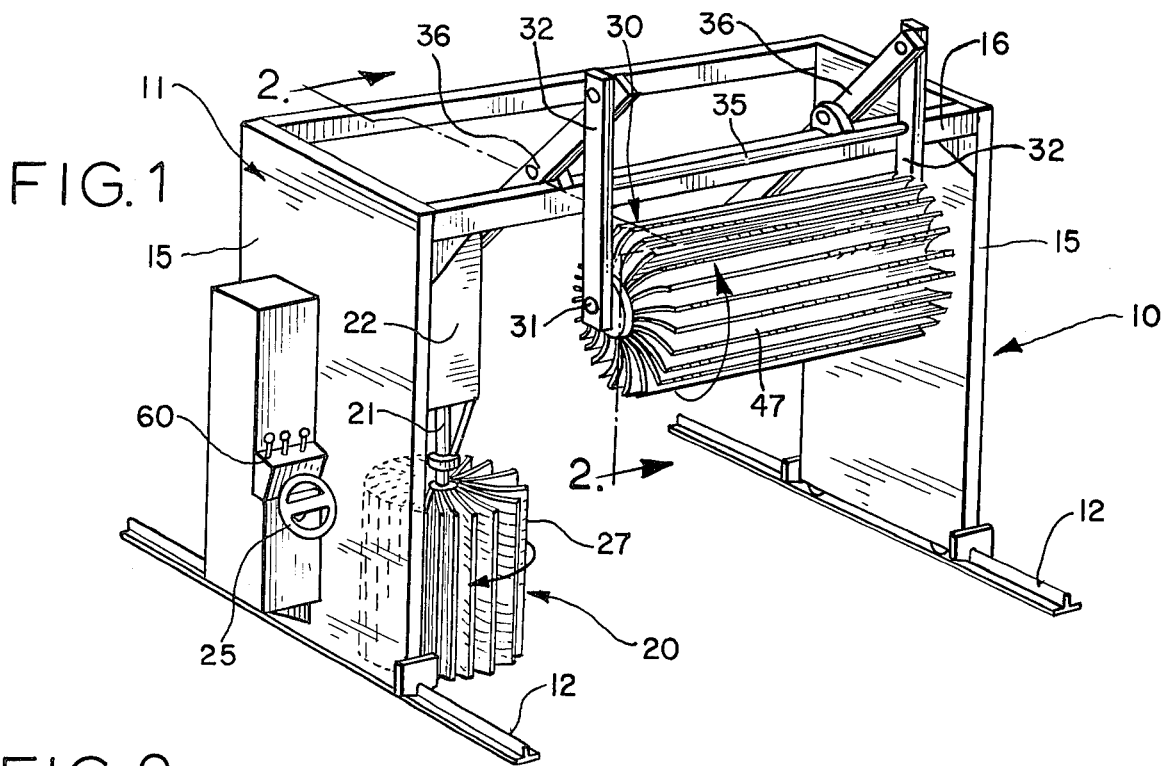
FIG. 1 is a perspective view of a vehicle surface preparation and waxing machine with improved head constructions for performing the method of the invention, with the vehicle not shown.

Referring now to the drawings, and particularly to FIG. 1, a vehicle surface preparation and waxing machine embodying features of the present invention is illustrated generally at 10. The machine 10 includes an inverted U-shaped carriage 11 which travels on parallel tracks 12. The carriage 11 defines an arch over an automobile (not shown) as it traverses the automobile front to back and return and the machine cleans, deoxidizes, and waxes the automobile.

The carriage 11 includes vertical side frames 15 which support a horizontally disposed roof frame 16. The frames 15 and 16 are light weight structural steel components fabricated in a well known manner and connected by conventional welding techniques. Suspended from the roof frame 16 for travel back and forth across the width of the carriage 11 is a vertical buffing head assembly 20.

The buffing head assembly 20 includes a vertical mounting shaft 21 which is journaled in a bearing box 22 and depends therefrom. A suitably arranged electric motor (not shown) mounted on the bearing box 22 is connected by a chain drive to the shaft 21 and rotates it in a manner and at a speed hereinafter discussed in detail. Movement of the head assembly 20 back and forth across the carriage 11 is effected by cable connections (not shown) to an operator control wheel 25.

Mounted on the shaft 21 and extending radially therefrom are the buffing strips 27. The manner in which these strips 27 are mounted on the shaft 21 and the method by which they are utilized to produce a high quality wax finish on a vehicle will hereinafter be discussed in relation to the horizontal buffing head assembly 30.

Immediately in front of, and above, the vertical axis head assembly 20 is the horizontal buffing head assembly 30. The buffing head assembly 30 includes a horizontal mounting shaft 31 (see FIG. 2) which extends between downwardly extending support arms 32. The support arms 32 are rigidly connected by a transverse shaft 35 above the shaft 31. Forwardly extending pivot arms 36 are journaled on the roof frame 16 and pivotally connected to corresponding support arms 32. The pivot arms 36 are counterweighted at their inner ends for a reason hereinafter discussed.

A chain drive from an electric motor (not shown) extends through one of the support arms 32 and is suitably connected to the shaft 31 to rotate the shaft according to the invention. The rotational speed of both head assemblies 20 and 30 is preset, preferably at 185–190 rpm, as has been pointed out.

Figure 2:
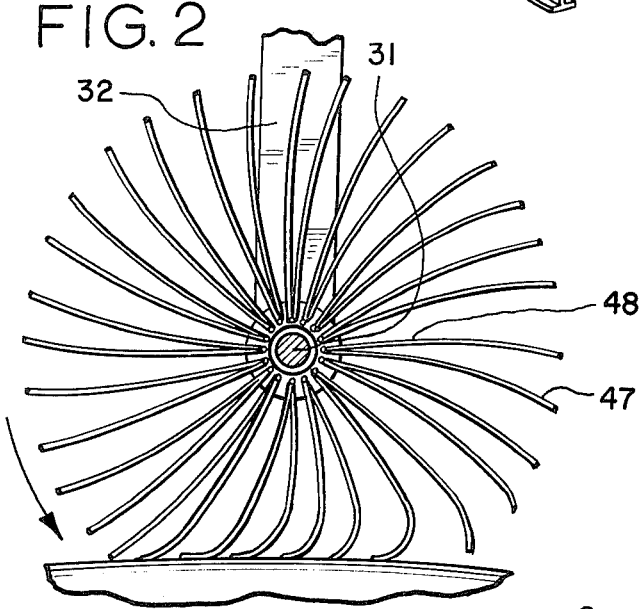
FIG. 2 is a sectional view taken along line 2—2 of FIG. 1.
Figure 3:
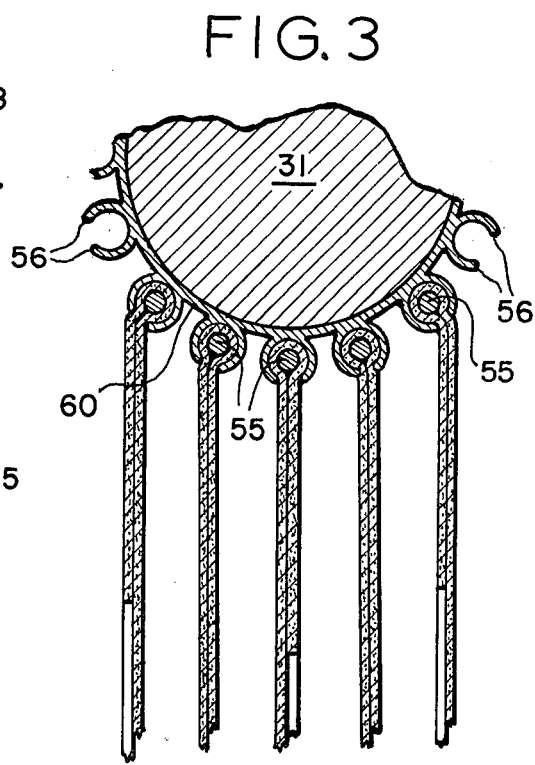
FIG. 3 is an enlarged sectional view taken through the axis of the horizontal head, with parts removed.
Figure 4:
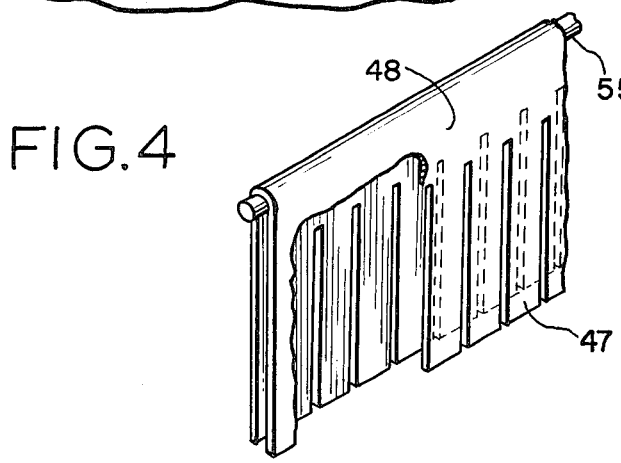
FIG. 4 is a perspective view of a pad used in the head construction, prior to being assembled onto the head.

Referring to FIGS. 2–4 the head assembly 30 includes waxing strips 47 which are mounted on the shaft 31 in the manner identical to the head assembly 20. As seen specifically in FIG. 4, the strips 47 are formed in opposite ends of each pad 48 of heavy (⅜ inch thick) material fabricated of wool and Orlon.

Each pad is slit inwardly from its outer edge at 2½ inch intervals along its length, as has previously been pointed out. The slits extend inwardly 12 inches from the edge of each pad so as to provide a series of 12 inch strips, each 2½ inches wide. The pads are slit on a staggered basis so that they do not line up and, as a result, each strip overlaps two strips on a pad next adjacent to it.

Each pad is held on the shaft 31 by folding it over a connecting rod 55 and slipping the covered rod between segmentally cylindrical ears 56 formed on mounting brackets 60. Two mounting brackets 60 are fastened to each other in a manner illustrated in FIG. 3 around the shaft 31. Sixteen rods 55 carrying a corresponding number of pads 48 are slipped between corresponding ears 56 in the manner illustrated. There are thus thirty-two half-pads extending outwardly of the shaft 31. Suitably formed caps are placed over the ends of the rods 55 and ears 56 to hold the pads 48 in place.

The head assemblies 20 and 30 are moved past the stationary automobile while being rotated in a direction corresponding to their direction of travel; i.e., looking at the machine 10 from the left in FIG. 1, the machine is travelling to the left and the head assembly 30 is rotating counterclockwise. Looking downwardly at the head assembly 20, the head 20 is rotating clockwise. The operator controls movement of the vertical head assembly 20, the horizontal head assembly 30, and the machine itself, from the console 60.

The operator applies a waxing compound such as previously discussed to the surfaces of the automobile immediately prior to buffing by the buffing head assemblies. The head assembly 30 buffs the top of the hood of the automobile, the top of the automobile, and then the top of the trunk, in succession, as it moves toward the rear of the automobile. Being counterweighted, the head assembly 30 rides easily up and down onto these surfaces. The head assembly 20 initially traverses the side of the automobile closest to the operator. As has also previously been discussed, the head assemblies traverse the automobile, preferably at a rate of 5.78 feet per minute, while rotating preferably at 187 rpm.

When the machine 10 reaches the back of the automobile, the operator raises the horizontal head assembly 30 and the vertical axis head assembly 20 is moved across the back by the operator manipulating the wheel 25 until the opposite side of the car is reached. The machine 10 then starts forward under the control of the operator. At this point, the direction of rotation of the horizontal axis waxing head 30 automatically reverses. The machine 10 moves forward, buffing the car, at the same speed which it traveled at in the opposite direction. When the front of the automobile is reached, the horizontal head assembly 30 is raised by the operator and the vertical axis head assembly 20 manipulated to move across the front of the car, buffing it while returning to its position illustrated in FIG. 1.

This is the cleaning and deoxidizing step. It has been performed while the wax is still moist. Now the machine 10 traversal front to back and return is repeated. No additional wax is applied, however. In this step the polishing is effected.

The automobile has received four buffing passes on its horizontal surfaces. The vertical surfaces get only two. Thus the horizontal surfaces, which collect the most grime, and oxidize the most, receive twice the treatment so that all surfaces are uniform at completion.

While the machine and method embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a vehicle surface preparation and waxing machine having a buffing head for rotating relative to the vehicle surface and buffing such surface after wax has been applied, the improvement in buffing head construction, comprising:
    a. a mounting shaft for rotating on an axis substantially parallel to the surface, and
    b. a plurality of fabric pads ⅜ inch thick aligned with said shaft, extending substantially radially therefrom, and having their inner ends fastened to such shaft,
    c. said pads being fabricated of both wool and synthetic fibres,
    d. each of such pads being slit inwardly from its outer edge at approximately 2½ inches intervals to define a series of strips,
    e. each said strip being approximately 12 inches long.
    f. said pads being slit so that a strip in each pad overlaps two strips in each adjacent pad.

* * * * *